United States Patent [19]

Takiguchi

[11] Patent Number: 4,624,296

[45] Date of Patent: Nov. 25, 1986

[54] PNEUMATIC TIRE SUITABLE FOR RUNNING ON SNOW AND ICE ROADS

[75] Inventor: Eiji Takiguchi, Tokyo, Japan

[73] Assignee: Bridgestone Corporation, Tokyo, Japan

[21] Appl. No.: 673,455

[22] Filed: Nov. 21, 1984

[30] Foreign Application Priority Data

Dec. 12, 1983 [JP] Japan ................ 58-232728
May 23, 1984 [JP] Japan ................ 59-102726

[51] Int. Cl.$^4$ .................... B60C 1/00; B60C 11/00
[52] U.S. Cl. .................... 152/209 R; 152/564; 525/236; 526/340
[58] Field of Search ............ 152/209 R, 330 R, 564; 526/340; 525/236, 237

[56] References Cited

U.S. PATENT DOCUMENTS

| | | | |
|---|---|---|---|
| 4,323,485 | 4/1982 | Ahagon et al. | 152/209 R |
| 4,387,756 | 6/1983 | Ogawa et al. | 152/209 R |
| 4,396,743 | 8/1983 | Fujimaki et al. | 152/209 R |

Primary Examiner—Michael Ball

Attorney, Agent, or Firm—Sughrue, Mion, Zinn, Macpeak, and Seas

[57] ABSTRACT

A pneumatic tire suitable for running on snow and ice roads is improved by providing tread portion composed of a rubber composition comprising 100 parts by weight of a blend rubber consisting of (A) 50 to 90 parts by weight of at least one rubber selected from the group consisting of natural rubber, polyisoprene rubber, butadiene-styrene copolymer rubber, polybutadiene rubber, butyl rubber and halogenated butyl rubber and (B) 10 to 50 parts by weight of a diene type rubber containing 0 to 25% of styrene group (x) and 0 to 50% of 1,2 vinyl bond group (y), (x) and (y) satisfying the following relationship:

$$\left(\frac{y-50}{x}\right) \leq -2 \text{ and } \left(\frac{y-5}{x}\right) \geq -\frac{5}{2}$$

mixed with 40 to 100 parts by weight of carbon black and 0 to 60 parts by weight of a softener and vulcanized.

4 Claims, 1 Drawing Figure

PNEUMATIC TIRE SUITABLE FOR RUNNING ON SNOW AND ICE ROADS

BACKGROUND OF THE INVENTION

1. Field of the Invention

This invention relates to a pneumatic tire suitable for running on snow and ice roads, and more particularly, it is concerned with a pneumatic tire suitable for running on snow and ice roads, which has improved performances by increasing the tread-gripping force of the tread portion on snow or ice road surface. In this case, the snow and ice roads include both general snow and ice roads at a temperature of at least $-20°$ C. (hereinafter referred to as snow and ice roads) and completely frozen ice roads at a temperature of at most $-20°$ C. in severe cold regions (hereinafter referred to as completely frozen roads). The following illustration is according to this definition.

2. Description of the Prior Art

There have heretofore been proposed various pneumatic tires suitable for running on snow and ice roads and completely frozen roads, but their performances are not necessarily satisfactory and further improvement thereof is still desired. In this respect, various efforts to a study of the materials of a tread portion have heretofore been made in order to increase the tread-gripping force on snow-covered or ice-covered road surfaces. For example, it is well-known from C. S. Wilkinson; RCT 27 255 (1954), F. S. Conant; RCT 22 863 (1949), etc. that the hardness of rubber at low temperature is lowered. As is described in W. G. Nörich; "The friction of Polymer on Ice", Journal of the IRI, October page 192 (1972), Desmond Moore; "The Friction of Pneumatic Tires" (1975), etc., it is known that butadiene rubber has an excellent tread-gripping force. However, butadiene rubber shows lowered performances on completely frozen roads at lower than $-20°$ C. so that a sufficient tread-gripping force cannot be obtained, which is considered due to that butadiene rubber crystalizes at a low temperature such as $-20°$ C. or lower to raise its modulus of elasticity as well-known in the art.

When using natural rubber or polyisoprene rubber in the rubber composition of a tread portion, the tread-gripping force on snow and ice roads is improved, but that on wet roads is disadvantageously lowered. For the purpose of mitigating the lowering of the tread-gripping force on wet roads, it has also been proposed to use a large amount of styrene-butadiene copolymer rubber, butyl rubber or carbon black as disclosed in A. C. Bassi; RCT 38 112 (1965), D. Bulgin, G. D. Hubberd and M. H. Walters; Proc. 4th Rubber Tech. Conf. London 193 (1962), etc. In this case, however, the performances on snow and ice roads and rolling resistance are unfavourably lowered.

SUMMARY OF THE INVENTION

It is an object of the present invention to provide a pneumatic tire suitable for running on snow and ice roads, whereby the above described disadvantages can be overcome.

It is another object of the present invention to provide a rubber composition for a tire tread portion, in particular, excellent in tread-gripping force on snow and ice roads.

These objects can be attained by a rubber composition for a tire comprising (A) 50 to 90 parts by weight of at least one rubber selected from the group consisting of natural rubber, polyisoprene rubber, butadiene-styrene copolymer rubber, butadiene rubber, butyl rubber and halogenated butyl rubber and (B) 10 to 50 parts by weight of a diene-type rubber containing 0 to 25% of styrene group (x) and 0 to 50% of 1,2 vinyl group (y), (x) and (y) satisfying the following relationship:

$$\left(\frac{y-50}{x}\right) \leq -2 \text{ and } \left(\frac{y-5}{x}\right) \geq -\frac{5}{2}$$

BRIEF DESCRIPTION OF THE DRAWING

The accompanying drawing is to illustrate the principle and merits of the present invention.

DETAILED DESCRIPTION OF THE INVENTION

Figure 1:
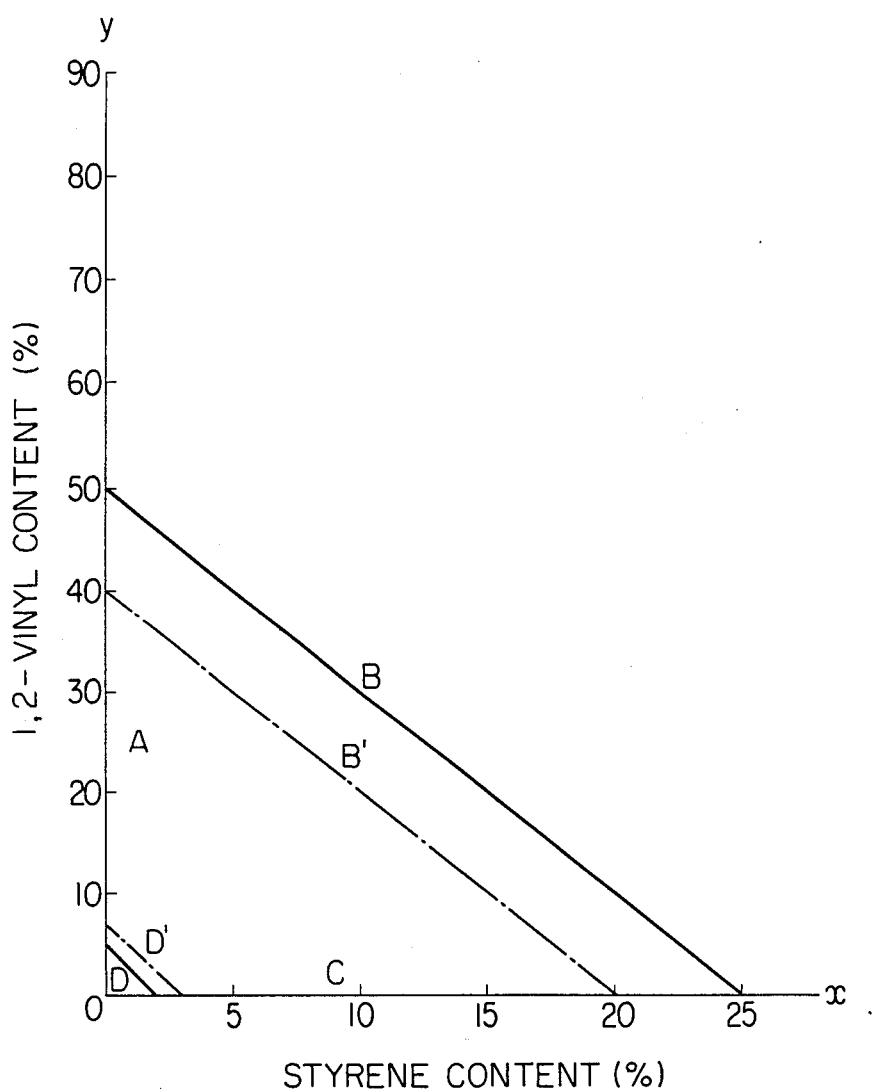
FIG. 1 is a graph showing the relationship of the styrene content and 1,2 vinyl content of butadiene rubber used in the present invention with the zone within the scope of the present invention.

The inventor has made studies on the material of a tire tread portion in order to achieve the above described objects and consequently has found that the tread-gripping force at low temperature can be held higher by preventing the crystallization of butadiene rubber and the crystallization of butadiene rubber at lower than $-20°$ C. can be prevented without deteriorating the properties thereof by the use of a diene type rubber containing 0 to 25% of styrene group (x) and 0 to 50% of 1,2 vinyl group (y), (x) and (y) satisfying the relationship of:

$$\left(\frac{y-50}{x}\right) \leq -2 \text{ and } \left(\frac{y-5}{x}\right) \geq -\frac{5}{2}$$

Accordingly, the present invention provides a rubber composition for a tire tread, which comprises 50 to 90 parts by weight of at least one rubber selected from the group consisting of natural rubber, polyisoprene rubber, butadiene-styrene copolymer rubber, butadiene rubber, butyl rubber and halogenated butyl rubber and 10 to 50 parts by weight of a diene type rubber containing 0 to 25% of styrene group (x) and 0 to 50% of 1,2 vinyl group (y), (x) and (y) satisfying the following relationship:

$$\left(\frac{y-50}{x}\right) \leq -2 \text{ and } \left(\frac{y-5}{x}\right) \geq -\frac{5}{2}$$

and an improved pneumatic tire suitable for snow and ice roads, which tread portion is composed of a rubber composition obtained by mixing 100 parts by weight of the above described rubber composition with 40 to 100 parts by weight of carbon black and 0 to 60 parts by weight of a softener and then curing the mixture.

The pneumatic tire according to the present invention is characterized in that the tread portion is made up of the above described rubber composition. As the starting rubber in this rubber composition, there is used a rubber blend comprising (A) 50 to 90 parts by weight, preferably 55 to 85 parts by weight of at least one rubber selected from the group consisting of natural rubber, polyisoprene rubber, butadiene-styrene copolymer rubber, butadiene rubber, butyl rubber and halogenated butyl rubber and (B) 10 to 50 parts by weight, preferably 15 to 45 parts by weight of a diene type rubber containing 0 to 25%, preferably 0 to 20% of styrene group (x) and 0 to 50%, preferably 0 to 40% of 1,2 vinyl bond (y), (x) and (y) satisfying the relationship of $$\left(\frac{y-50}{x}\right) \leqq -2 \text{ and } \left(\frac{y-5}{x}\right) \geqq -\frac{5}{2},$$

$$\text{preferably } \left(\frac{y-40}{x}\right) \leqq -2 \text{ and } \left(\frac{y-7}{x}\right) \geqq -\frac{7}{3}.$$

In the starting rubber, if the amount of Component (A) is less than 50 parts by weight, the tread-gripping force on wet roads is lowered, while if more than 90 parts by weight, the tread-gripping force on snow and ice roads and completely frozen roads is lowered. This is not favourable. If the amount of Component (B) is more than 50 parts by weight, the tread-gripping force on wet roads is lowered, while if less than 10 parts by weight, the performances on snow and ice roads and completely frozen roads are deteriorated. This is not favourable.

As to Component (B), if the styrene content exceeds 25% and 1,2 vinyl bond content exceeds 50%, the diene type rubber can be prevented from crystallization, but exhibits a performance similar to styrene-butadiene, which is inferior in tread-gripping force on snow and ice roads. If the relationship of (x) and (y) is $$\left(\frac{y-50}{x}\right) > -2 \text{ or } \left(\frac{y-5}{x}\right) < -\frac{5}{2},$$

the diene type rubber exhibits a performance similar to butadiene, which tends to crystallize. In this case, the tread-gripping force on snow and ice roads is improved, but that on completely frozen roads is not improved.

In the relationship between the styrene content and 1,2 vinyl content of a diene rubber according to the present invention, it is preferable to select them in the zone surrounded by A-B-C-D, preferably A-B'-C-D' as shown in FIG. 1, When the styrene content (%) of a diene type rubber is represented by x and the 1,2 vinyl bond content thereof is represented by y, there are the following relationships:

Curve B: $y = -2x + 50$

Curve B': $y = -2x + 40$

Curve D: $y = -5/2x + 5$

Curve D': $y = -7/3x + 7$

Thus, the zone surrounded by A-B-C-D in FIG. 1 can be represented by:

$(-5/2x+5) \leqq y \leqq (-2x+50)$ $0 \leqq x \leqq 25$ and $0 \leqq y \leqq 50$ Similarly, the zone surrounded by A-B'-C-D' in FIG. 1 can be represented by:

$(-7/3x+7) \leqq y \leqq (-2x+40)$ $0 \leqq x \leqq 20$ and $0 \leqq y \leqq 40$ In a particularly preferred embodiment of the present invention, an improved pneumatic tire suitable for running on snow and ice roads has a tread portion composed of a rubber composition comprising 100 parts by weight of a blend rubber consisting of (A) 25 to 85 parts by weight of natural rubber or polyisoprene rubber, (B) 5 to 25 parts by weight of butyl rubber of halogenated butyl rubber and (C) 10 to 50 parts by weight of a butadiene-styrene copolymer rubber containing 1 to 10% of bonded styrene group and 2 to 20% of 1,2 vinyl bond group, mixed with 40 to 100 parts by weight of carbon black and 0 to 60 parts by weight of a softener, followed by curing. The materials respectively in Component (A) and Component (B) can be used individually or in combination.

In this rubber composition, there is used, as the starting rubber, a blend rubber consisting of (A) 25 to 85 parts by weight of natural rubber or polyisoprene rubber, (B) 5 to 25 parts by weight of butyl rubber or halogenated butyl rubber and (C) 10 to 50 parts by weight of a butadiene-styrene copolymer rubber containing 1 to 10% of bonded styrene group and 2 to 20% of 1,2 vinyl bond group. In the starting rubber, if the amount of Component (A) is less than 25 parts by weight, the tread-gripping force on wet roads is lowered, while if more than 85 parts by weight, the tread-gripping force on snow and ice roads and completely frozen roads is lowered. This is not favourable. If the amount of Component (B) is less than 5 parts by weight, the tread-gripping force on wet roads is lowered, while if more than 25 parts by weight, the performances on snow or ice roads and completely frozen roads, and the wear resistance are deteriorated. This is not favourable.

As to Component (C), if the styrene content exceeds 10% and the 1,2 vinyl bond content exceeds 20%, the butadiene rubber can be prevented from crystallization, but exhibits a performance similar to styrene-butadiene, which is inferior in tread-gripping force on snow and ice roads. If the styrene content is less than 1% or the 1,2 vinyl content is less than 2%, the butadiene rubber becomes more similar to butadiene and tends to crystallize, so that the tread-gripping force on snow and ice roads is improved, but that on completely frozen roads is not improved.

In the rubber composition of the present invention, reinforcing carbon black is preferably mixed in a proportion of 40 to 100 parts by weight to 100 parts by weight of the blend rubber, since if the amount of it is less than 40 parts by weight, the tread-gripping force on wet roads and the wear resistance are lowered, while if more than 100 parts by weight, the wear resistance is lowered.

In addition, a softener is preferably added in a proportion of 0 to 60 parts by weight to 100 parts by weight of the blend rubber, since if the amount of the softener is more than 60 parts by weight, the wear resistance is unfavourably lowered. The softener generally includes both petroleum type softeners and low temperature plasticizers. Examples of the petroleum type softener are paraffin type process oils, naphthene type process oils and aromatic process oils, which have a viscosity gravity constant (VGC) of 0.80 to 1.0. Examples of the low temperature plasticizer are ester type plasticizers, i.e. phthalic acid derivatives such as phthalic acid diesters; esters of aliphatic mono-basic acids such as oleic acid derivatives; esters of aliphatic dibasic acids such as derivatives of adipic acid, azelaic acid and sebacic acid; and derivatives of phosphoric acid. Preferably, both the softener and plasticizer are used as a blend.

Moreover, other additives commonly used in the ordinary rubber composition such as vulcanizing agents, vulcanization accelerators, acceleration aids, antioxidants and the like can be added to the rubber composition of the present invention.

The objects of the present invention can be achieved by forming a tread portion with the above described rubber composition. For the purpose of controlling the tread-gripping force on snow and ice roads and completely frozen roads, it is important that the dynamic storage modulus (E') at $-40°$ C. is not more 300 kg/cm$^2$, preferably not more than 280 kg/cm$^2$, E' at $-20°$ C. is not more than 200 kg/cm$^2$, preferably not more than 180 kg/cm$^2$ and E' at 0° C. is not more than 150 kg/cm$^2$, preferably not more than 130 kg/cm$^2$. Further, it is important to keep small change of E' at such a temperature range in order to maintain well the performances on snow and ice roads under various environmetal conditions. Particularly, if $$E'(-40° C.) - E'(-20° C.) \leq 120 \text{ kg/cm}^2$$

$$E'(-20° C.) - E'(0° C.) \leq 80 \text{ kg/cm}^2$$

the tread-gripping force on snow and ice roads as well as on completely frozen roads can be increased.

In the pneumatic tire of the present invention, whose tread portion is composed of the foregoing specified rubber composition, the tread-gripping force on snow and ice roads at $-20°$ C. or higher can be increased and in addition, the tread-gripping force on completely frozen roads at lower than $-20°$ C. can markedly be raised, without degrading the tread-gripping force on wet roads and wear resistance. Therefore, the pneumatic tire of the present invention is very suitable for running in such cold districts.

EXAMPLES

The present invention will now be illustrated in greater detail by examples.

Forty nine kinds of tires each having a tire size of 165 SR 13 were prepared by forming a tread portion with a rubber composition according to the compounding recipes as shown in Tables 2 and 3, respectively, in which compounding parts are by weight. With respect to the each tire, the tread-gripping force on a snow or ice road surface, the tread-gripping force on a completely frozen road surface, the tread-gripping force on a wet road surface (wet skid resistance), and the wear resistance were evaluated by the following methods on the basis of the actual running test to obtain results as shown in Tables 2 and 3.

EVALUATION METHOD (1) Tread-gripping force on snow or ice road surface

During running at a speed of 20, 30 or 40 km/hr, braking was applied to measure a stopped distance which was represented by an index on the basis that a tire of Comparative Example 1 was 100. This test was carried out at a temperature of at least $-20°$ C. in the day time. The larger the index value, the better the performance.

(2) Tread-gripping force on completely frozen road surface

During running at a speed of 20, 30 or 40 km/hr, braking was applied to measure a stopped distance which was represented by an index on the basis that the tire of Comparative Example 1 was 100. This test was carried out at a temperature of at most $-20°$ C. in the night time. The larger the index value, the better the performance.

(3) Wet skid resistance

During running on a wet asphalt road at a speed of 40, 70 or 100 km/hr, rapid braking was applied to measure a running distance required for completely stopping, which was represented by an index on the basis that the tire of Comparative Example 1 was 100. The larger the index value, the better the performance.

(4) Wear resistance

Apart from the tires used for the evaluation of the cornering property and stability, a tire was prepared by dividing circumferentially the tread into two sections, one of which was composed of the tread rubber composition of Comparative Example 1, and subjected to running on a paved road over a distance of 50,000 km. Then, the wear amount was measured, from which a distance required for a wear loss of 1 mm was evaluated by an index on the basis that the tire of Comparative Example 1 was 100. The larger the index value, the better the property.

(5) Measurement of E'

Using a viscoelastic spectrometer made by Iwamoto Seisakusho, E' was measured at a frequency of 50 cps and a dynamic strain ratio of 1% at the elongation of a static strain ratio of 5%. The sample had a rectangular solid shape having a dimension of 20 mm in length, 5 mm in width and 2 mm in thickness.

The micro structure of samples of the diene type rubbers used in Examples is shown in Table 1:

TABLE 1

| Sample No. | Micro Structure | | | | Ratio of x and y | |
|---|---|---|---|---|---|---|
| | 1,2 Vinyl (g) | Cis | Trans | Styrene (x) | $\frac{y - 50}{x}$ | $\frac{y - 5}{x}$ |
| Sample· | | | | | | |
| A | 6 | 90 | 4 | 3 | −14.67 | −0.33 |
| B | 25 | 25 | 50 | 4 | −6.25 | 5.0 |
| C | 20 | 30 | 50 | 10 | −3.0 | 1.5 |
| D | 1 | 40 | 50 | 15 | −3.27 | −0.27 |
| E | 10 | 35 | 55 | 0 | −40 | 5 |
| F | 25 | 25 | 50 | 10 | −2.5 | 2 |
| G | 40 | 30 | 30 | 12 | −0.83 | 2.92 |
| H | 85 | 5 | 10 | 5 | 7.0 | 16 |
| BR01 | 2 | 95 | 3 | — | −48 | −3 |
| SBR1500 | 16 | 7 | 77 | 23.5 | −1.45 | 0.47 |
| I | 4 | 90 | 6 | 1 | −4.6 | −1 |
| J | 0 | 95 | 5 | 25 | −2 | −0.2 |
| K | 50 | 30 | 20 | 0 | 0 | 4.5 |
| L | 18 | 32 | 50 | 8 | −4 | 1.63 |
| M | 16 | 40 | 44 | 15 | −2.27 | 0.73 |

TABLE 2

| | Examples | | | | | | | | | | | | | | | | Comparative Examples | | | | | | | | | | |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 |
| Natural Rubber | 70 | 70 | 70 | 70 | 70 | 70 | 50 | 45 | 50 | 50 | 70 | 70 | 70 | | 60 | 60 | | 70 | 70 | 70 | 70 | 70 | 70 | 70 | 70 | | |
| Polyisoprene Rubber | | 30 | | | | | 20 | | | | | | | 30 | | | | | | | | | | | | | |
| SBR (SBR 1500) | | | 30 | | | | | 15 | | | | | | | | | 100 | 30 | | 30 | | | | | | 100 | 60 |
| Polybutadiene Rubber (BR01) | | | | 30 | | | | | 20 | | | | | | | | | | | | | | | | | | |
| Chlorobutyl Rubber (HT1068) | | | | | 30 | | | | | 10 | | | | | | | | | | | | | | | | | 40 |
| Sample | | | | | | 30 | | | | | | | | | | | | | | | | | | | | | |
| A | 30 | | | | | | 30 | 40 | | 40 | 30 | 30 | | 40 | 20 | 20 | | | | | | | 70 | 30 | 30 | | |
| B | | | | | | | | | 30 | | | | | 30 | | | | | | | | | | | 30 | | |
| C | | | | | | | | | | | | | 30 | | | | | | | | | | | | | | |
| D | | | | | | | | | | | | | | | | | | | | | | | | | | | |
| E | | | | | | | | | | | | | | | | | | | | | 30 | | | | | | |
| F | | | | | | 30 | | | | | | | | | | | | | | | | | | | | | |
| I | | | | | | | | | | | | 10 | | | | | | | | | | | | | | | |
| G | | | | | | | | | | | | | | | 20 | | | | | 30 | | | | | | | |
| H | | | | | | | | | | | | | | | | 20 | | | | | | | | | | | |
| J | | | | | | | | | | | | | | | | | | | | | | | | | | | |
| K | | | | | | | | | | | | | | | | | | | | | | | | | | | |
| Carbon Black (N339) | 80 | 80 | 80 | 80 | 80 | 80 | 80 | 80 | 80 | 80 | 85 | 80 | 80 | 80 | 80 | 80 | 60 | 80 | 80 | 80 | 80 | 80 | 120 | 30 | 80 | 75 | 75 |
| Petroleum Softener | 50 | 50 | 50 | 50 | 50 | 50 | 50 | 50 | 50 | 50 | 30 | 30 | 50 | 40 | 50 | 50 | 15 | 50 | 50 | 50 | 50 | 50 | 60 | 30 | 90 | 30 | 30 |
| Aromatic Oil | | | | | | | | | | | 20 | 10 | | 10 | | | | | | | | | | | | | |
| Spindle Oil | | | | | | | | | | | | | | | | | | | | | | | | | | | |
| Ester Plasticizer | | | | | | | | | | | | 10 | | | | | | | | | | | | | | | |
| Aliphatic Monobasic Acid Ester | | | | | | | | | | | | | | | | | | | | | | | | | | | |
| Stearic Acid | 1 | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ | ↑ |
| Antioxidant (IPPD) | 1 | | | | | | | | | | | | | | | | | | | | | | | | | | |
| Zinc White | 3 | | | | | | | | | | | | | | | | | | | | | | | | | | |
| Accelerator | | | | | | | | | | | | | | | | | | | | | | | | | | | |
| DPG | 0.2 | | | | | | | 0.3 | 0.3 | | | | | | | | 0.8 | | | | | | | | | | |
| DM | 0.9 | | | | | | | 0.4 | 0.6 | | | | | | | | 0.7 | | | | | | | | | | |
| NOBS | | | | | | | | 0.6 | 0.6 | | | | | | | | | | | | | | | | | | |
| Sulfur | 1.5 | | ↑ | | ↑ | ↑ | ↑ | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.8 | 1.8 |
| E' −40° C. | 180 | 275 | 230 | 278 | 193 | 295 | 178 | 183 | 168 | 195 | 165 | 145 | 280 | 192 | 242 | 235 | 450 | 350 | 320 | 530 | 340 | 150 | 330 | 123 | 128 | 345 | 465 |
| E' −20° C. | 118 | 165 | 132 | 169 | 121 | 178 | 115 | 123 | 105 | 121 | 102 | 95 | 169 | 118 | 142 | 135 | 245 | 129 | 180 | 290 | 230 | 124 | 280 | 75 | 81 | 230 | 293 |
| E' 0° C. | 92 | 120 | 95 | 123 | 93 | 129 | 91 | 95 | 89 | 93 | 81 | 78 | 95 | 90 | 98 | 92 | 145 | 98 | 115 | 159 | 123 | 83 | 170 | 43 | 53 | 131 | 152 |
| E' −40-E' −20 ≤ 120 | 62 | 110 | 98 | 109 | 72 | 117 | 63 | 60 | 63 | 74 | 63 | 50 | 120 | 74 | 100 | 98 | 205 | 221 | 140 | 240 | 110 | 20 | 50 | 48 | 47 | 115 | 172 |
| E' −40-E' −20 ≤ 80 | 26 | 45 | 37 | 46 | 28 | 12 | 24 | 28 | 16 | 28 | 21 | 17 | 65 | 28 | 44 | 43 | 100 | 31 | 65 | 131 | 107 | 30 | 110 | 32 | 6 | 99 | 141 |
| E' −20-E' 0 ≤ 80 | 130 | 120 | 125 | 122 | 127 | 115 | 132 | 129 | 137 | 128 | 134 | 142 | 111 | 130 | 118 | 121 | 100 | 103 | 105 | 82 | 103 | 137 | 101 | 145 | 140 | 104 | 89 |
| Skid Resistance on Ice (<−20° C.) | 119 | 111 | 115 | 109 | 119 | 105 | 120 | 118 | 121 | 117 | 123 | 119 | 117 | 118 | 108 | 111 | 100 | 118 | 104 | 88 | 111 | 121 | 95 | 128 | 124 | 105 | 85 |
| Skid Resistance on Ice (>−20° C.) | 113 | 108 | 111 | 104 | 114 | 104 | 113 | 111 | 118 | 119 | 119 | 113 | 112 | 121 | 107 | 108 | 100 | 113 | 111 | 91 | 105 | 111 | 85 | 123 | 121 | 102 | 94 |
| Skid Resistance on Snow (>−20° C.) | 103 | 105 | 109 | 108 | 101 | 111 | 101 | 106 | 99 | 114 | 101 | 105 | 99 | 108 | 112 | 111 | 100 | 99 | 101 | 110 | 95 | 82 | 91 | 75 | 77 | 85 | 125 |
| Wet Skid Resistance | 108 | 103 | 102 | 103 | 103 | 99 | 101 | 108 | 121 | 99 | 101 | 101 | 103 | 103 | 102 | 101 | 100 | 102 | 104 | 98 | 101 | 105 | 65 | 53 | 72 | 102 | 65 |
| Wear Resistance | | | | | | | | | | | | | | | | | | | | | | | | | | | |

TABLE 3

| | Example | | | | | | | | | | Comparative Example | | | | | | | | | | | | |
|---|---|---|---|---|---|---|---|---|---|---|---|---|---|---|---|---|---|---|---|---|---|---|---|
| | 17 | 18 | 19 | 20 | 21 | 22 | 23 | 24 | 25 | 26 | 12 | 13 | 14 | 15 | 16 | 17 | 18 | 19 | 20 | 21 | 22 | 23 |
| Natural Rubber | 60 | 60 | 50 | 40 | 65 | 60 | 60 | 60 | 40 | 60 | | 35 | 50 | 50 | 50 | 20 | 30 | 85 | 60 | 35 | 35 | 35 |
| Polyisoprene Rubber | | | | 20 | | | | | | | | | | | | | | | | | | |
| SBR (SBR 1500) | | | | | | | | | | | 100 | | | | | | | | | | | |
| Polybutadiene Rubber (BR01) | | | | | | | | | | | | | 40 | | | | | | | | | |
| Chlorobutyl Rubber (HT1068) | 15 | 15 | 10 | 15 | | 15 | 15 | 15 | | | | 20 | 10 | 40 | | 10 | 40 | 10 | 15 | 20 | 20 | 20 |
| Butyl Rubber | | | 40 | | 10 | | | | 20 | 20 | | | | 10 | 50 | 70 | 30 | 5 | 20 | 45 | | |
| Sample A | 25 | | | 25 | 25 | 25 | 25 | | 40 | 20 | | | | | | | | | | | | |
| Sample I | | 25 | | | | | | 25 | | | | 45 | | | | | | | | | | 45 |
| Sample L | | | | | | | | | | | | | | | | | | | | | 45 | |
| Sample B | | | | | | | | | | | | | | | | | | | | 30 | | |
| Sample G | | | | | | | | | | | | | | | | | | | | | | |
| Sample M | | | | | | | | | | 10 | | | | | | | | | | | | |
| Carbon Black (N339) | 80 | 80 | 80 | 80 | 80 | 80 | 80 | 80 | 80 | 80 | 60 | 80 | 80 | 80 | 80 | 80 | 80 | 80 | 120 | 80 | 80 | 80 |
| Petroleum Softener | 55 | 55 | 50 | 55 | 55 | 25 | 25 | 50 | 50 | 45 | 15 | 50 | 50 | 50 | 50 | 50 | 50 | 50 | 60 | | 50 | 50 |
| Aromatic Oil | | | | | | 25 | 10 | | | | | | | | | | | | | | | |
| Spindle Oil | | | | | | | | | | | | | | | | | | | | | | |
| Ester Plasticizer | | | | | | | | | 5 | | | | | | | | | | | | | |
| Aliphatic Monobasic Acid Ester | | | | | | | | 5 | | | | | | | | | | | | | | |
| Stearic Acid | 1 | ↑ | ↑ | ↑ | ↑ | ↑ | ↑ | ↑ | ↑ | ↑ | .8 | ↑ | ↑ | ↑ | ↑ | .9 | ↑ | ↑ | ↑ | ↑ | ↑ | ↑ |
| Antioxidant (IPPD) | 1 | | | | | | | | | | .7 | | | | | .6 | | | | | | |
| Zinc White | 3 | | | | | | | | | | | | | | | | | | | | | |
| Accelerator DPG | .2 | .2 | .2 | .2 | .2 | .2 | .2 | .2 | .2 | .2 | | .2 | .2 | .2 | .3 | | .2 | .2 | .1 | .3 | .2 | .2 |
| DM | .9 | .9 | .8 | .9 | .9 | .9 | .9 | .9 | .8 | .8 | | .9 | .8 | .8 | 1.6 | 1.5 | 1.8 | .9 | 1.0 | 1.4 | .9 | .9 |
| NOBS | 1.5 | 1.5 | 1.5 | 1.5 | 1.5 | 1.5 | 1.5 | 1.5 | 1.5 | 1.5 | 1.5 | 1.5 | 1.5 | 1.5 | 2.0 | 1.5 | 1.8 | 1.5 | 1.5 | 1.5 | 1.5 | 1.5 |
| Sulfur | 197 | 202 | 195 | 195 | 193 | 169 | 144 | 199 | 194 | 201 | 450 | 325 | 352 | 463 | 235 | 154 | 452 | 347 | 351 | 310 | 360 | 328 |
| E' −40° C. | 124 | 119 | 121 | 123 | 121 | 112 | 93 | 129 | 123 | 128 | 245 | 184 | 232 | 135 | 137 | 127 | 283 | 235 | 296 | 143 | 193 | 187 |
| E' −20° C. | 92 | 87 | 93 | 92 | 88 | 77 | 76 | 101 | 91 | 102 | 145 | 117 | 127 | 98 | 101 | 84 | 151 | 135 | 181 | 87 | 121 | 119 |
| E' 0° C. | 73 | 83 | 74 | 72 | 72 | 57 | 51 | 70 | 71 | 73 | 205 | 67 | 120 | 328 | 98 | 27 | 169 | 112 | 55 | 167 | 167 | 141 |
| E' −40−E' 20 ≦ 120 | 32 | 32 | 28 | 31 | 33 | 35 | 25 | 28 | 32 | 26 | 100 | 141 | 105 | 37 | 36 | 43 | 132 | 100 | 115 | 56 | 72 | 68 |
| E' −20−E' 0 ≦ 80 | 129 | 121 | 128 | 131 | 131 | 132 | 141 | 125 | 132 | 120 | 100 | 104 | 103 | 101 | 118 | 135 | 95 | 104 | 101 | 104 | 102 | 103 |
| Skid Resistance on Ice (< −20° C.) | 114 | 119 | 117 | 116 | 115 | 121 | 119 | 112 | 116 | 113 | 100 | 105 | 104 | 118 | 115 | 119 | 86 | 103 | 94 | 121 | 102 | 104 |
| Skid Resistance on Ice (> −20° C.) | 119 | 121 | 119 | 120 | 119 | 122 | 114 | 117 | 119 | 116 | 100 | 109 | 107 | 113 | 112 | 109 | 97 | 108 | 84 | 105 | 108 | 110 |
| Skid Resistance on Snow | 115 | 111 | 114 | 115 | 109 | 110 | 104 | 119 | 118 | 120 | 100 | 103 | 105 | 101 | 81 | 84 | 121 | 88 | 99 | 89 | 104 | 102 |
| Wet Skid Resistance | 101 | 105 | 99 | 100 | 107 | 102 | 101 | 104 | 99 | 101 | 100 | 102 | 106 | 102 | 101 | 102 | 67 | 102 | 68 | 48 | 103 | 101 |
| Wear Resistance | | | | | | | | | | | | | | | | | | | | | | |

What is claimed is:

1. A rubber composition for a tire comprising 100 parts by weight of a blend rubber consisting of (A) 25 to 85 parts by weight of natural rubber or polyisoprene rubber and 5 to 25 parts by weight of butyl rubber or halogenated butyl rubber and (B) 10 to 50 parts by weight of butadiene-styrene copolymer rubber containing 1 to 10% of bonded styrene group (x) and 2 to 20% of 1,2 vinyl bond group (y), (x) and (y) satisfying the following relationship:

$$\left(\frac{y-50}{x}\right) \leq -2 \text{ and } \left(\frac{y-5}{x}\right) \geq -\frac{5}{2}$$

2. A pneumatic tire suitable for running on snow and ice roads, having a tread portion composed of a rubber composition comprising 100 parts by weight of a blend rubber consisting of (A) 25 to 85 parts by weight of natural rubber or polyisoprene rubber and 5 to 25 parts by weight of butyl rubber or halogenated butyl rubber and (B) 10 to 50 parts by weight of a butadiene-styrene copolymer rubber containing 1 to 10% of bonded styrene group (x) and 2 to 20% of 1,2 vinyl bond group (y), (x) and (y) satisfying the following relationship:

$$\left(\frac{y-50}{x}\right) \leq -2 \text{ and } \left(\frac{y-5}{x}\right) \geq -\frac{5}{2}$$

mixed with 40 to 100 parts by weight of carbon black and 0 to 60 parts by weight of a softener and vulcanized.

3. The pneumatic tire of claim 2, wherein the vulcanized rubber composition has a property satisfying the following relationship:
(a) $E'(-40° C.) - E'(-20° C.) \leq 120 \text{ kg/cm}^2$
(b) $E'(-20° C.) - E'(0° C.) \leq 80 \text{ kg/cm}^2$.

4. The pneumatic tire of claim 2, wherein the softener is selected from the group consisting of petroleum softeners and low temperature plasticizers.

* * * * *